United States Patent
Hodges et al.

(10) Patent No.: US 9,063,577 B2
(45) Date of Patent: *Jun. 23, 2015

(54) USER INPUT USING PROXIMITY SENSING

(71) Applicant: Microsoft Corporation, Redmond, WA (US)

(72) Inventors: Stephen E. Hodges, Cambridge (GB); Alex Butler, Cambridge (GB); Shahram Izadi, Cambridge (GB); Malcolm Hall, Glasgow (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,124

(22) Filed: Apr. 28, 2013

(65) Prior Publication Data

US 2013/0234970 A1 Sep. 12, 2013

Related U.S. Application Data

(63) Continuation of application No. 11/948,802, filed on Nov. 30, 2007, now Pat. No. 8,432,372.

(51) Int. Cl.
| | |
|---|---|
| *G06F 3/041* | (2006.01) |
| *G06F 3/01* | (2006.01) |
| *G06F 1/16* | (2006.01) |
| *G06F 3/03* | (2006.01) |
| *G06F 3/0346* | (2013.01) |
| *G06F 3/0354* | (2013.01) |
| *G06F 3/042* | (2006.01) |
| *G06F 3/0488* | (2013.01) |
| *G06F 3/044* | (2006.01) |

(52) U.S. Cl.
CPC .............. *G06F 3/017* (2013.01); *G06F 3/044* (2013.01); *G06F 1/1626* (2013.01); *G06F 1/1684* (2013.01); *G06F 1/169* (2013.01); *G06F 3/0304* (2013.01); *G06F 3/0346* (2013.01); *G06F 3/03547* (2013.01); *G06F 3/041* (2013.01); *G06F 3/042* (2013.01); *G06F 3/04883* (2013.01); *G06F 2203/0339* (2013.01); *G06F 2203/04106* (2013.01)

(58) Field of Classification Search
USPC ................................ 345/156–183; 178/18.03
See application file for complete search history.

(56) References Cited

U.S. PATENT DOCUMENTS

| | | | | |
|---|---|---|---|---|
| 5,900,863 | A * | 5/1999 | Numazaki | 345/158 |
| 7,006,236 | B2 * | 2/2006 | Tomasi et al. | 356/614 |
| 2003/0210258 | A1 * | 11/2003 | Williams | 345/700 |
| 2006/0238517 | A1 * | 10/2006 | King et al. | 345/173 |
| 2007/0125633 | A1 * | 6/2007 | Boillot | 200/52 R |
| 2007/0159453 | A1 * | 7/2007 | Inoue | 345/156 |
| 2008/0309631 | A1 * | 12/2008 | Westerman et al. | 345/173 |

* cited by examiner

*Primary Examiner* — Srilakshmi K Kumar
*Assistant Examiner* — Sosina Abebe
(74) *Attorney, Agent, or Firm* — Steve Wight; Judy Yee; Micky Minhas

(57) ABSTRACT

A device is described which enables users to interact with software running on the device through gestures made in an area adjacent to the device. In an embodiment, a portable computing device has proximity sensors arranged on an area of its surface which is not a display, such as on the sides of the device. These proximity sensors define an area of interaction adjacent to the device. User gestures in this area of interaction are detected by creating sensing images from data received from each of the sensors and then analyzing sequences of these images to detect gestures. The detected gestures may be mapped to particular inputs to a software program running on the device and therefore a user can control the operation of the program through gestures.

20 Claims, 15 Drawing Sheets

USER INPUT USING PROXIMITY SENSING

RELATED APPLICATION

This application is a continuation of, and claims priority to, U.S. patent application Ser. No. 11/948,802, filed Nov. 30, 2007, and entitled "USER INPUT USING PROXIMITY SENSING." The disclosure of the above-identified application is hereby incorporated by reference in its entirety as if set forth herein in full.

BACKGROUND

On small electronic devices, such as mobile telephones and PDAs (personal digital assistants), there is only a small area which is available for user input buttons whilst any reduction in the size and spacing of buttons is limited by the size of a human finger. If buttons are too small and/or are too close together, they become difficult to use and the possibility of accidental key presses increases.

In order to increase the available area for buttons and other user input devices, some small electronic devices incorporate a touch sensitive screen. User input in such devices may be through a combination of soft buttons on the screen and physical buttons, or alternatively, all inputs may be made via the touch sensitive screen. However, the size of the touch screen is still limited by the overall device size and the same restriction applies to reducing the size and spacing of soft buttons. Furthermore, when a user touches the screen, a significant portion of the display area may be obscured from view.

The embodiments described below are not limited to implementations which solve any or all of the disadvantages of known electronic devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A device is described which enables users to interact with software running on the device through gestures made in an area adjacent to the device. In an embodiment, a portable computing device has proximity sensors arranged on an area of its surface which is not a display, such as on the sides of the device. These proximity sensors define an area of interaction adjacent to the device. User gestures in this area of interaction are detected by creating sensing images from data received from each of the sensors and then analyzing sequences of these images to detect gestures. The detected gestures may be mapped to particular inputs to a software program running on the device and therefore a user can control the operation of the program through gestures.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
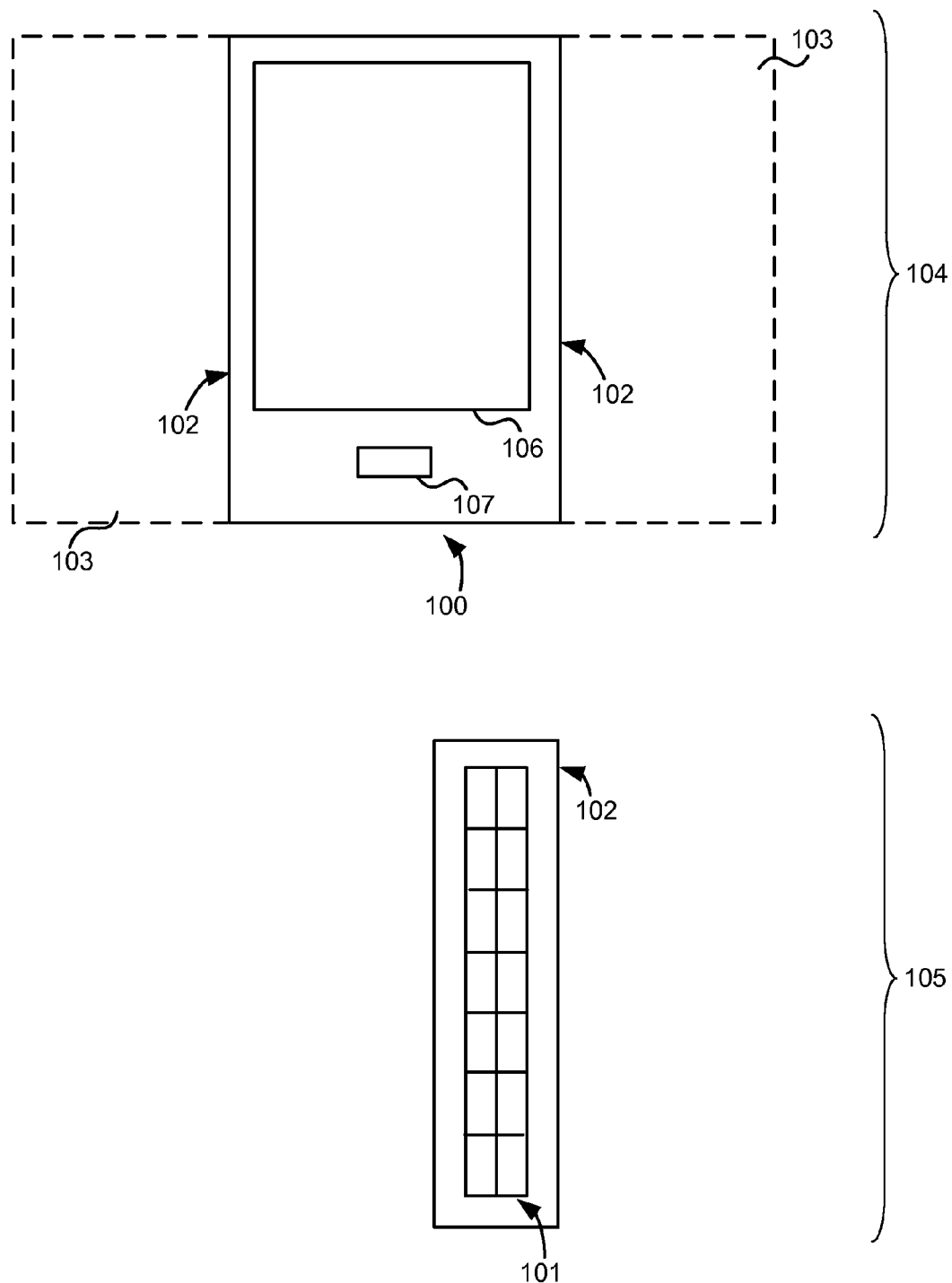
FIG. 1 is a schematic diagram of a portable computing device.

FIG. 1 is a schematic diagram of a portable computing device 100 which has an arrangement of proximity sensors 101 along one or more of its sides 102. These proximity sensors, which may be arranged in an array, look outward from the device and are used to detect gestures in an area of interaction 103 adjacent to the side 102 of the device. The gestures detected are in the plane of the device's display or in a plane which is parallel to (and close to) the plane of the device's display. The portable computing device 101 may be a PDA, UMPC (Ultra Mobile PC), handheld/tablet/laptop computer, mobile telephone, music player, gaming console, satellite navigation system etc. FIG. 1 shows two views of the device: a front view 104 and a side view 105. In the example of FIG. 1, the device comprises a display 106 and may also comprise physical buttons 107 and the arrangement of proximity sensors comprises a 2×7 array of sensors. This array is shown by way of example only and the arrangement of sensors may have any number of elements and may be in any shape and further examples are described below. Where the sensors are described as being arranged in an array in the following discussion, this is by way of example only and the sensors may be arranged in any manner.

The sensors may be any type of proximity sensor such as sensors using optical (photoelectric), acoustic, ultrasonic, electrostatic (capacitive) or inductive techniques. An exemplary proximity sensor is described below with reference to FIG. 4. In further examples, proximity may be detected using a camera and image processing algorithms. The arrangement of sensors 104 may comprise sensors of the same time or sensors of different types.

The operation of the computing device 100 of FIG. 1 can be described with reference to the flow diagram shown in FIG. 2. Data is collected from each of the operational sensors in the array 101 (block 201). The operational sensors in the array may be all of the sensors in the array, however, in some embodiments, some of the sensors may be switched off (e.g. to save power). From this sensor data, a proximity sensor image is generated (block 202). This image is a 2D image of depth/distance from the device. These two steps (blocks 201 and 202) are then repeated to create a sequence of images and the sequence is analyzed to detect motion/gestures (block 203). The detected gestures are then mapped to inputs/operations which are used to control software running on the device (block 204). In many cases, the detected gestures are used to control applications running on the device but in some examples the gestures may be used to control the operating system. In other examples, the detected gestures may be used to control applications and/or the operating system running on another device.

The term 'gestures' is used herein to refer to movement by a user or caused by a user (e.g. where motion of an object moved by a user is detected). The gesture may be pre-defined (e.g. a user moving a hand in a circle may have a particular meaning) or may be any other movement.

The device shown in FIG. 1 with proximity sensors along two sides provides two areas of user interaction 103 which are off the device itself. A user can therefore control the device by gesturing in an area of user interaction and in doing so the user does not obscure any of the image displayed on the display 106. Examples of these gestures and the resulting effect on the operation of the device can be described with reference to FIG. 3. In an example, a user may be able to scroll around a document or image 300 which is larger than the display. The area of the document/image displayed is shown as a rectangle 301 on the document/image 300 in FIG. 3. Simple finger sweeps may be mapped to panning operations, e.g. sweeping the finger down may cause scrolling down (representations 302), sweeping the finger to the left may pan to the left (representations 303) etc. Finger operations may also be used to zoom in/out, for example using gestures such as pinching for zooming in (representations 304) or the opposite for zooming out (representations 305). Single finger or multiple finger gestures can be detected or movements of the entire hand etc.

In some examples, the analysis (in block 203) may consider images from multiple arrays (or arrangements) of sensors. The device shown in FIG. 1 has arrays of sensors on two sides and the images from both these arrays may be used to identify gestures which involve both hands. For example, a user may zoom in on an image/document by moving both hands towards the device (representation 306) or may zoom out by moving both hands away from the device (representation 307).

In a further example, the gestures may be used for selection of items from a menu. A pie menu may be used such that the direction of the gesture corresponds to selection of a different menu item.

Figure 3:
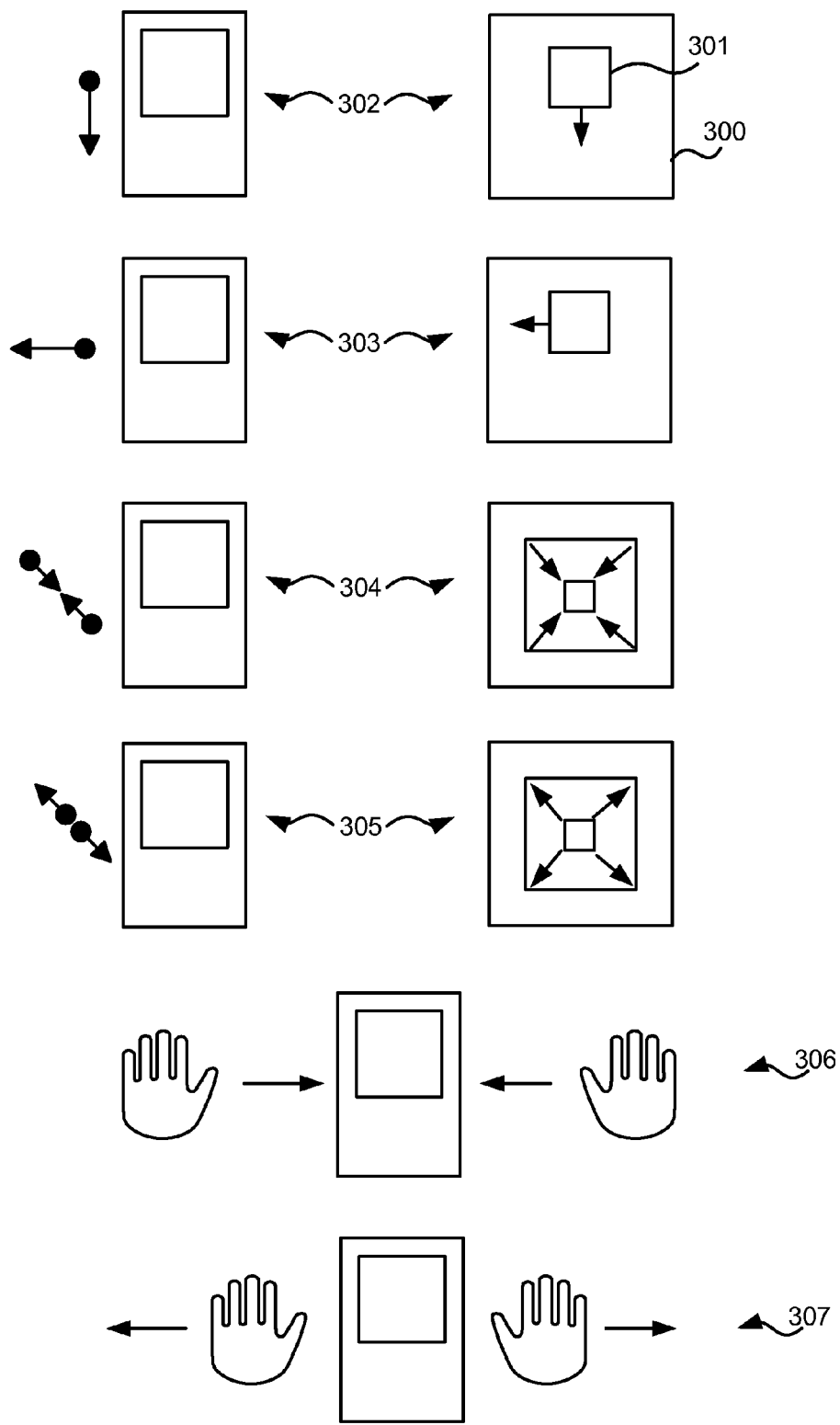
FIG. 3 shows example gestures and their resulting effect on software running on a device such as that shown in FIG. 1.

The gesture based interaction described above may be combined with other modes of interaction. For example, where the computing device supports use of a stylus to write on the screen or to use to touch soft buttons etc, the gesture based interaction may be used in combination with stylus based input to provide bimodal interactions. In an example, one hand may be used, in an area of interaction to one side of the device, to control the virtual paper/canvas which is shown under the pen on the device. This enables the orientation, scaling and position of the writing region to be manipulated (e.g. through gestures as shown in FIG. 3) simultaneously and independently of the pen writing activity. This provides a very natural mode of interaction for a user which enables them to keep the region of interest displayed on the limited display space available. Where such bi-modal interaction is enabled, the two sensing inputs, e.g. the proximity sensing input and the stylus input, may be synchronized. In a further example, the gesture based interaction in the interaction zone (as described above) may be combined with touch input on a touch sensitive display.

The methods and apparatus described above provide a multi-touch interface which expands the available interaction area. This may be particularly beneficial for small computing devices, which are generally portable, but may also be applicable to larger, non-portable devices (as described below). In an example implementation, the area of interaction adjacent to the proximity sensors may be 10 cm wide. This may result in areas of interaction which are as big as, or bigger than the computing device itself. Dependent on the arrangement of sensors, the resolution may be low (e.g. 1 cm or 0.5 cm spacing of sensors) however, as it is gestures that are recognized (e.g. change between sensor images), high resolution may not be required. In applications where higher resolution is required, sensors may be provided on a much smaller pitch and the arrangement of the sensors may be tailored to the particular application (as described in more detail below). As described in more detail below, the resolution of an arrangement of sensors may be varied by controlling which of the sensors are operational.

Figure 4:
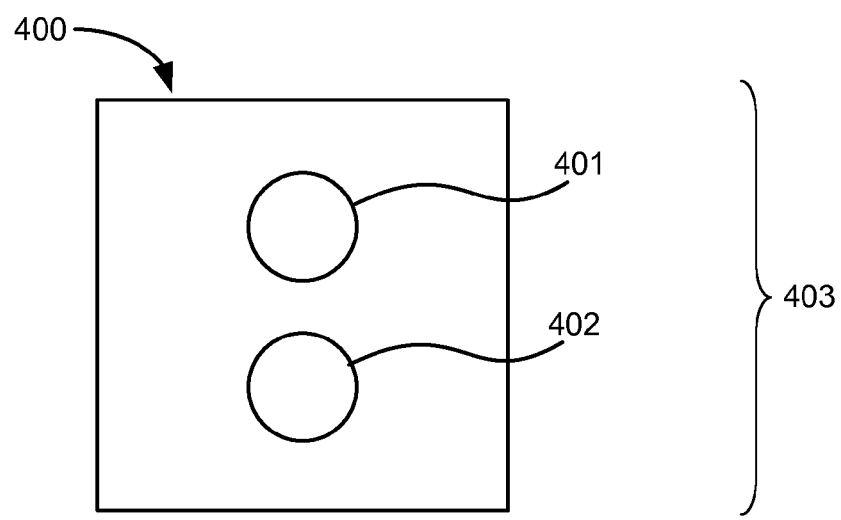
FIG. 4 shows a schematic diagram of an exemplary sensor.
Figure 4:
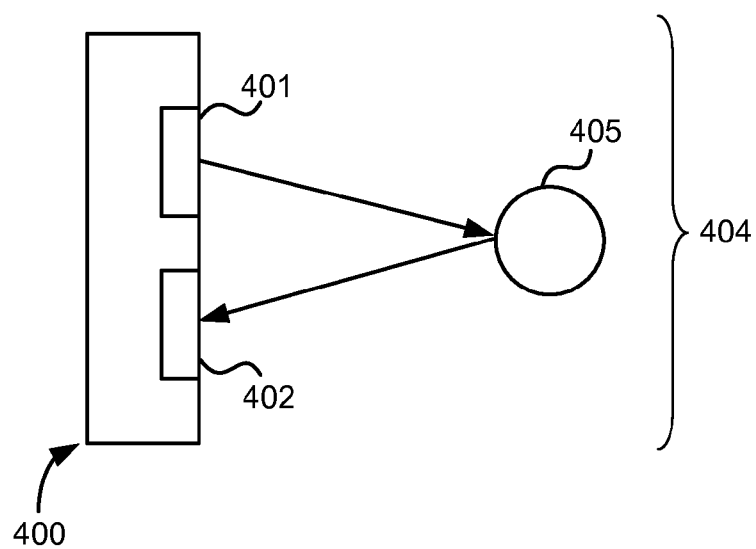

FIG. 4 shows a schematic diagram of an exemplary sensor 400 which comprises an emitter 401 and a detector 402. A front view 403 and a side view 404 of the sensor are shown. The operation of the sensor is shown in the side view 404. The emitter 401 emits electromagnetic radiation of a particular wavelength (or range of wavelengths) and the detector 402 detects radiation which is reflected back by objects 405. The intensity of the reflected radiation may be detected and this intensity will vary depending upon the distance between the sensor 400 and the reflecting object 405. In such an example, the sensor image generated (in block 202) will be an intensity map, with high intensities indicating that an object is closer to the device at that point than where lower intensities are detected. In an example, the emitter may be an Infra-Red (IR) emitter (e.g. at 850 nm or 980 nm) and the detector may be able to detect IR radiation of the emitted wavelength. Other wavelengths may alternatively be used, such as visible wavelengths or ultra-violet radiation.

In an example where IR is used, the IR detector 402 may comprise suitable infrared-sensitive semiconductor elements. A non-exhaustive list of examples of semiconductor material that is infrared-sensitive includes polycrystalline silicon, monocrystalline silicon, microcrystalline silicon, nanocrystalline silicon, plastic semiconductors and other non-silicon based semiconductors. Devices based on polycrystalline, microcrystalline, monocrystalline or nanocrystalline silicon may have better stability than amorphous silicon devices. TFTs (thin film transistors) based on polycrystalline, microcrystalline, monocrystalline or nanocrystalline silicon may have higher field mobility than amorphous silicon TFTs. IR detector 402 may include, for example, a polycrystalline silicon TFT or photodiodes, a monocrystalline silicon TFT or photodiode, a microcrystalline silicon TFT or photodiode, or a nanocrystalline silicon TFT or photodiode. Infrared-sensitive semiconductor materials that are not based in silicon are also contemplated for elements of IR detector 402. In an example, the IR detector may comprise an IR-sensitive organic photosensor, which may comprise a reverse biased OLED (organic light emitting diode).

The IR emitter 401 may be an IR LED (light emitting diode), OLED, laser or other IR source. IR LEDs are commercially available at a low cost at a range of wavelengths, including, for example, peak emission wavelengths around 900 nm: 850 nm, 860 nm, 870 nm, 880 nm, 890 nm, 935 nm, 940 nm and 950 nm. At some of these wavelengths, high power versions of the IR LEDs are available.

Although FIG. 4 shows a sensor 400 which comprises a separate emitter 401 and detector 402, in another example the same device may be used as both an emitter and a detector. For example, an LED may be used both as an emitter (when forward biased) and a detector (when reverse biased).

Figure 5:
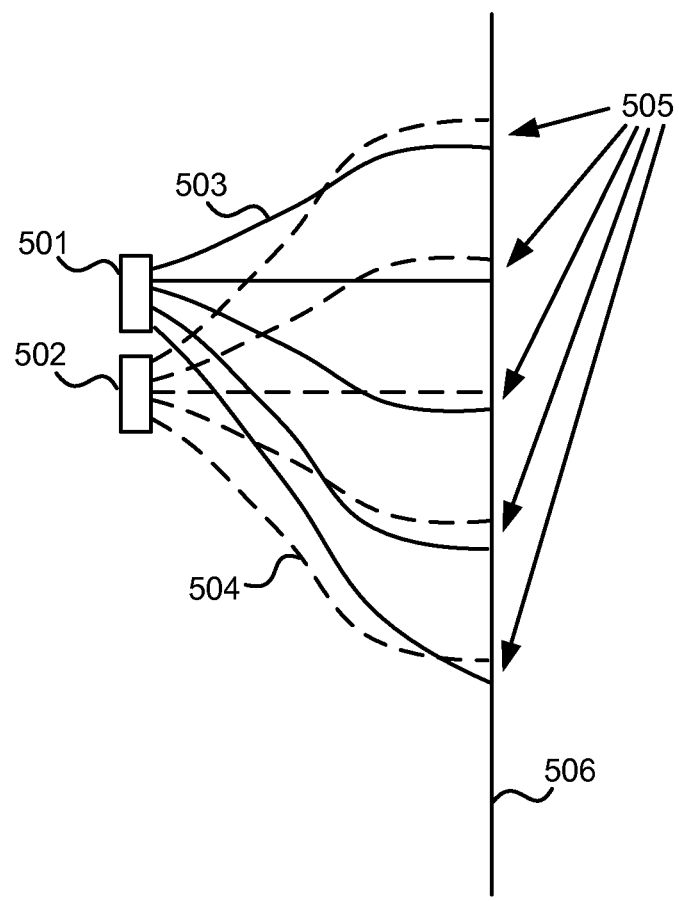
FIG. 5 shows a schematic diagram of a proximity sensing arrangement using optical waveguides.

Whilst in FIG. 1, the proximity sensors are located on the sides of the device, in other example implementations, waveguides may be used such that the active electronics need not be on the side of the device. An example waveguide arrangement is shown in FIG. 5. FIG. 5 shows an emitter array 501 and a detector array 502 and two waveguide fan-outs 503, 504. For reasons of clarity only, the detector fan-out 504 is shown by dotted lines. The fan-outs may, for example, be fabricated from optical fibers (which may be lensed at one or both ends) or may be fabricated using planar waveguide technology. This arrangement still provides an arrangement of proximity sensing points 505 along an edge 506 of a device but enables the active electronics to be placed away from the edge of the device. In other implementations, the emitter and detector arrays 501, 502 may be replaced by a single emitter (e.g. a source with beamwidth such that it couples into all of the waveguides in the emitter fan-out) and a single detector (e.g. a camera).

Whilst FIG. 5 shows two fan-outs, more than two stacked fan-outs may be provided (e.g. using multiple layers of planar waveguide technology or by laminating several layers of optical fibers) to produce additional planes of proximity sensing points and provide 2D sensed proximity data. Any arrangement of proximity sensing points may be defined using such fan-outs.

Alternative optical arrangements may be used instead of the waveguide fan-outs shown in FIG. 5. For example, any suitable combination of prisms, mirrors and lenses may be used. In some examples, the proximity sensors may not comprise an emitter and detector arrangement (as described above) but may instead comprise a camera (e.g. a 3D camera or a stereo camera) and associated image processing means, as described in more detail below. In a further example, a camera (used for taking photographs) already present in a device may be used to provide the proximity sensing apparatus. An optical arrangement, such as a prism or a wedge-shaped waveguide, may be used to enable the camera, which is typically on the rear of a device, to image in other directions (e.g. a rectangular aperture along the side of a device as an alternative to the array of sensors shown in FIG. 1). Image processing means (as described below) may then be used to create a proximity sensing image (i.e. a depth/distance map) from the image captured by the camera.

Figure 2:
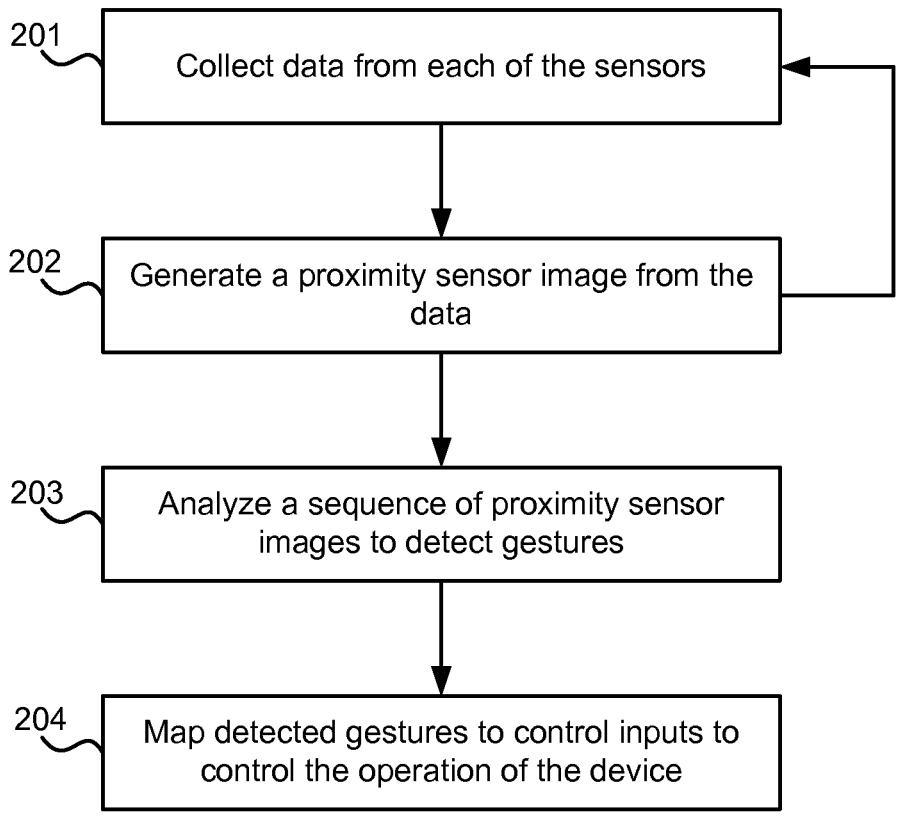
FIG. 2 is a flow diagram showing a method of operation of the device of FIG. 1.
Figure 6:
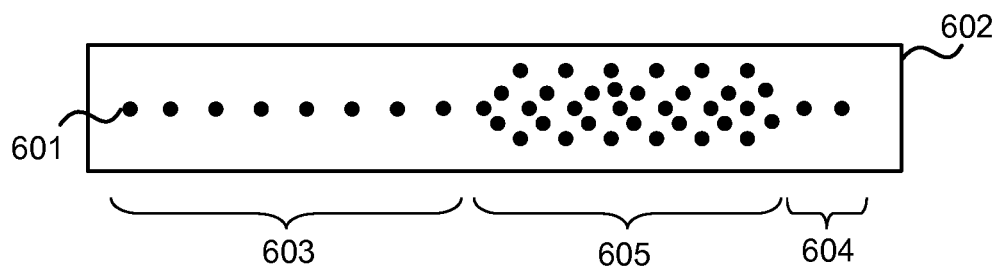
FIGS. 6 and 7 show example arrangements of sensors.

Whilst in FIG. 2 the arrangement of sensors is shown arranged in a regular grid pattern, this is by way of example only. In some examples, the sensors (or sensing points) may be arranged in a different pattern which may or may not be regular (e.g. a hexagonal array distribution or a free-form spatial distribution). FIG. 6 shows an example arrangement of sensors 601 on a side 602 of a device. The sensors are not arranged in a regular pattern but instead there are regions 603, 604 where there are fewer sensors and there is a region 605 where there are more sensors. In each region the sensors may be arranged in a regular pattern or they may be arranged irregularly. In the arrangement shown in FIG. 6, the different regions have different resolution for gesture detection. In the densely populated region 605 there is increased resolution compared to the other two regions 603, 604. Use of such a non-regular arrangement of sensors enables the resolution to be increased where required, for example in the region of the fingertips for detection of finger gestures. The pattern of sensors used may be determined based on a particular application and the ways in which a user is expected to interact with the device.

Figure 7:
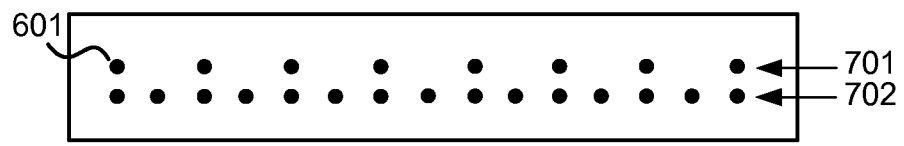

In a further example, the sensors may be arranged in a pattern (which may be regular or irregular) but all the sensors may not be operational all the time. By controlling which sensors are operational (i.e. where the emitter is emitting radiation and the detector detecting reflected radiation), the sensor pattern may be changed and therefore resolution may be varied with time, with position etc. There may be other reasons for varying the sensor pattern, in addition to or instead of adjusting the resolution. The resolution may, in some examples, be varied in response to detected gestures. For example, when there is no detected motion in the interaction area, the number of sensors which are operational may be reduced to reduce power consumption (and therefore improve battery life of the portable electronic device). However, once motion is detected (in block 203), additional sensors may be switched on (and therefore become operational) to increase the resolution of the sensor image and enable improved gesture detection (particularly for fine gestures). FIG. 7 shows another example sensor arrangement in which the sensors are arranged in two rows, 701, 702. The upper row 701 comprises sensors on a larger pitch to the lower row 702. This provides greater resolution in sensing gestures at this lower level. In an embodiment, all the sensors in the lower row 702 may be switched off until motion is detected by analysis of the sensor image from the upper row.

In another example, the pattern of sensors which are operational may be varied in order to provide additional information about the object which is in proximity to the device. For example, the pattern of operational sensors may be varied to build up more 3D information about the object, (e.g. to detect the difference between a flat retro-reflecting strip on a passive object compared to a retro-reflecting cylinder shaped object).

All the sensors in a particular arrangement may have a similar sensitivity (e.g. to within manufacturing tolerances) or alternatively, sensors of different sensitivity may be used. A sensor of increased sensitivity may be produced by increasing the size of the detector 402 and/or increasing the power of the emitter 401. A sensor with a higher sensitivity may be able to detect motion and gestures at a larger distance from the device. This may be beneficial where all the sensors are not powered (i.e. not operational) all the time. A few higher sensitivity sensors may be provided to enable longer range low resolution sensing. The other sensors may, for example, be switched off until motion or a particular gesture is detected from sensor images created using the higher sensitivity sensors. In some examples, the sensitivity of a sensor may be adjustable (e.g. the emitter power may be variable) such that the same sensors may be used for longer range and shorter range (lower power) sensing. Another technique which may be used to increase sensitivity is to integrate the sensing of a sensor over a much longer time period, and this also improves the signal to noise ratio of the measurement.

In another variation, different shaped proximity fields (e.g. different cone angles) may be used to distribute the detection regions in a non-uniform manner. This is another technique which enables resolution to be concentrated in areas of interest (e.g. region of fingertips) and reduced in areas of less interest (e.g. region of the palm of the hand) where high resolution is not required.

The particular arrangement of sensors and the selection of the sensitivity of each sensor may be chosen according to the particular application. In an example a mixture of sensors of different sensitivity and resolution may be provided. The arrangement of sensors which are operational may also be selected to conserve power (rather than to adjust resolution/sensitivity) and may be dependent on the remaining battery power in a portable device. In some embodiments, different kinds of sensors utilizing different radiations may be used, for example use of a combination of ultrasonic and optical sensors. Such a combination of sensors using different sensing techniques (or different types of radiation), may for example be used in order to optimize power consumption where the lowest power consumption sensor is used to identify initial contact before switching to a different set of better (e.g. more sensitive and/or higher resolution) but higher power consumption sensors for actually tracking objects. In another example passive infra-red sensors may be used to identify human hand movement in the vicinity of the device before switching to infra-red sensing to track the hand movement.

Although FIGS. 1 and 5 show the sensors being arranged on a planar surface, this is by way of example. In some examples, the sensors may be formed on a flexible substrate (e.g. by printing) or on a non-flexible formed substrate. Where the sensors are formed on a flexible substrate or where a flexible light guide (e.g. flexible fan-outs as shown in FIG. 5) is used to couple sensors with the sensing points, this substrate or light guide may be wrapped around a device. Furthermore, although the sensors are shown as side looking in FIGS. 1 and 5, the sensors may appear anywhere on the device (e.g. on the back of a device and/or around the display) and further examples are described in more detail below.

By arranging the sensors on different parts of the device, e.g. on different sides, discrete interaction zones may be defined around a device (e.g. two interaction zones in the example shown in FIG. 1). In some implementations, the gestures performed in any zone may have the same effect (i.e. may be mapped to the same control action in block 204), and in other examples, gestures in different zones may have different effects (i.e. be mapped to different control actions). In an example, the user may control a first application by gesturing in a first interaction zone and the user may control a second application (or the operating system) by gesturing in a second interaction zone. The role of each interaction zone may be reconfigurable. The mapping between gestures and the resulting effects may be defined in mapping tables or mapping data stored on the device.

Figure 8:
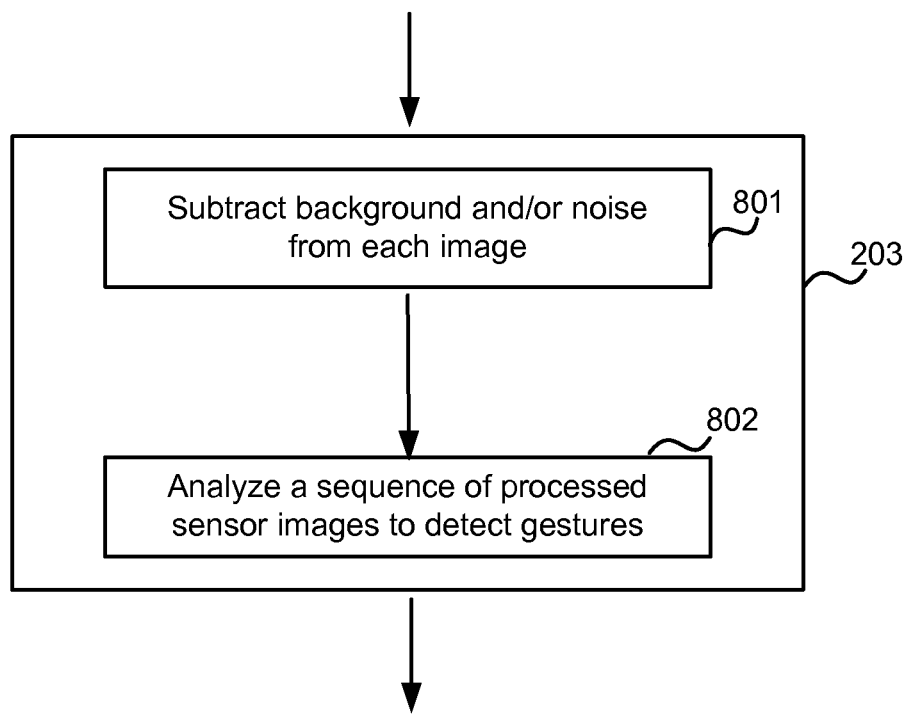
FIGS. 8 and 9 show steps from FIG. 2 in more detail.

The analysis of the sequence of sensor images (in block 203) may use optical flow techniques or computer vision techniques. In some examples, the analysis may involve background and/noise subtraction (block 801), as shown in FIG. 8. In an example, the background subtraction may use residual background proximity image subtraction. The residual background may be monitored and when the image is static for a period of time, suggesting that a user is not gesturing in the area of interaction, a calibration background image may be stored. This may then be used to subsequently subtract the background from each image in a sequence. The sequence of resultant processed images may then be analyzed (block 802), e.g. using optical flow or computer vision techniques.

Figure 9:
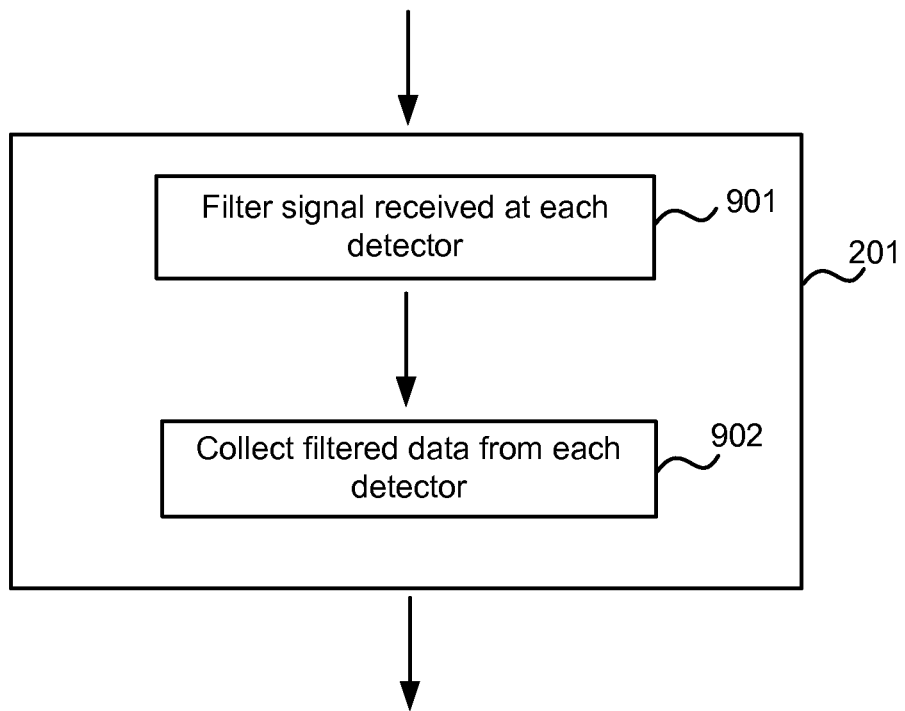

In another example, instead of filtering out the background from the images themselves, the detected signals may be filtered, as shown in FIG. 9. The emitter 401 may be modulated and the signal detected by each detector 402 filtered (block 901) to remove detected signals which are not reflections of the emitted radiation. The filtered signals may then be collected (block 902) in order to generate a proximity sensor image (in block 202).

The above description provides two examples of background subtraction/reduction techniques. These techniques may be implemented in isolation or in combination and any other suitable background subtraction/reduction technique may be used instead of (or in addition to) those described above. It is likely that over time some background subtraction techniques will require periodic recalibration to adjust to changing environmental conditions (e.g. light level deviations). A separate sensor mechanism may be used to do this or the actual proximity image sensing matrix data can be used to monitor overall shifts in the environment.

Where the proximity sensing is performed using a camera, the captured images may be analyzed to perform image segmentation to differentiate between background items and objects which are in proximity to the device. In some cases, the camera may comprise a stereo camera (which captures two images).

Figure 10:
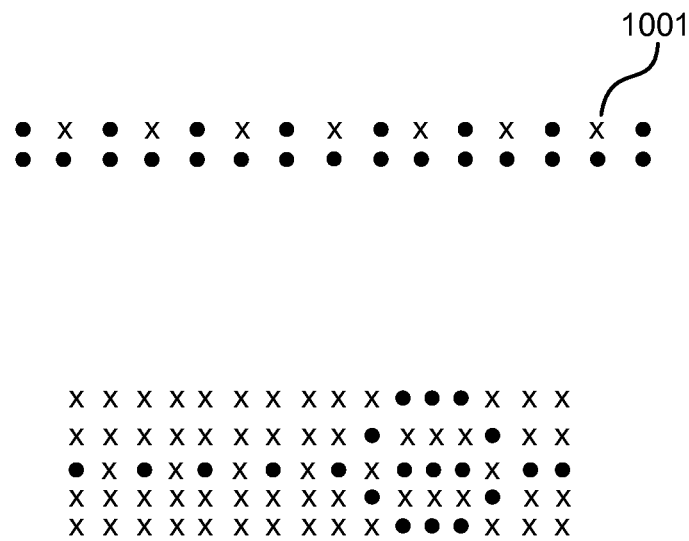
FIG. 10 shows two examples of a pixel conversion process.

If irregular arrangements of sensors are used, it may be necessary to process the sensor images prior to the analysis because some image processing techniques (e.g. some computer vision algorithms) expect an image comprising identical pixels arranged on a regular grid. In such a situation the images may be processed to insert dummy pixels 1001 (marked with an 'x' in FIG. 10) where the 'detected intensity' is set to a particular value rather than being detected. The particular value for any dummy pixel may be set to zero or a fixed value (which may be the same for all dummy pixels) or the value may be determined using interpolation, extrapolation or any other technique. These dummy pixels may be inserted to produce an image comprising a regular grid of pixels, where the pixels are a combination of actual pixels (corresponding to operational sensors) and dummy pixels. FIG. 10 shows two simple examples of such a conversion process.

The mapping between detected gestures and resulting actions (in block 204) may be defined by the applications (or operating system) that are being controlled. For example, the mappings as shown in FIG. 3 may be fixed. However, in some examples, some or all mappings may be user-configurable. In some examples, the user may be able to define their own gestures. This may require a machine learning application to be running on the computing device which can analyze a sequence of sensor images and from this determine a set of parameters which can be used to define the gesture. Once this new set of parameters has been determined, they may be used subsequently in the detection of gestures (in block 203).

Feedback may be provided to the user for many reasons, including but not limited to:
  providing an indication of the extent of the area of interaction;
  informing the user that fingertips have been sensed in proximity;
  confirming that a gesture has been recognized.

The feedback may, for example, be visual or audible, and visual feedback may, for example, be provided by optical projection or using the display on the device. Where optical projection is used, visible light sources (e.g. LEDs or lasers) may be placed close to the sensors to enable visible light to be shone into the area of interaction. The light source may be used to indicate the area of interaction (e.g. by illuminating that area or by marking the boundary of the area) or to indicate the objects in proximity have been sensed (e.g. by illuminating those objects) or to indicate that a gesture has been recognized (e.g. by a short flash of light which illuminates some or all of the area of interaction). In further examples, particular patterns or shapes may be used to provide visual user feedback and these may be projected onto the user's hands or onto other objects in the area of interaction around the device. On screen feedback may be provided through use of dialog boxes, pop-up messages etc. During the process of gesture recognition, an indication may be provided to the user (e.g. an egg-timer icon). Audible feedback may be provided through use of a ping, click or other noise when objects are sensed in proximity and/or when a gesture is identified. In another example, sensory feedback may be provided through vibrating the computing device.

The apparatus and methods described herein may be used to provide any kind of user input. In an example, the gestures may be used instead of a mouse. In some situations, a user may feel more comfortable holding and moving a physical object, rather than just moving their hand in the area of interaction. In such a situation a dummy mouse object (e.g. a sponge-like mouse form) may be used which does not communicate with the computing device but just provides an object for a user to hold and move. This object may be a custom object provided for use with the system or may be any other object (e.g. the user's mobile telephone, wallet etc). Use of an object in this way may also simplify the gesture recognition process by providing a defined shaped object to detect and track. For example rather than just trying to track proximity images of an arbitrary arrangement of fingers and thumbs moving in front of the sensors, use of ergonomic dummy objects will encourage the hands and thumbs to sit in a relatively constrained arrangement—this can help alleviate false tracking and noise problems as the tracked profile will be better defined.

Where the apparatus and methods described herein are used as a mouse replacement device, feedback may be provided to the user showing the position of the cursor on the screen (in a corresponding manner to where a conventional mouse is used). When gestures are recognized, the position of the cursor on the screen may move accordingly.

The dummy mouse object described above is a passive object, in that it does not communicate with the computing device. A passive object may provide some information to the device according to the nature of the reflected radiation, such as the shape. In some examples, the dummy object held by the user may be identified from its shape and this information used to control the software. For example a user gripping a dummy mouse object in front of the sensors may switch the software to mouse input mode; gripping a dummy joystick object may switch the software to a joystick input mode; and gripping a dummy pen shape could switch the software to a pen input mode.

In some embodiments, passive objects may be used which are tagged so that they can be identified by the computing device. For example, they may be tagged by having reflective elements on them of particular shapes (e.g. reflective barcodes). Use of different tagged passive objects may result in the device operating in different ways (e.g. gestures being mapped to different control inputs, different themes, different applications being displayed etc) or may identify different users, different access levels etc. Examples of tagged objects may include game playing pieces, rotary dials (e.g. for controlling an application where the rotation of the dial can be detected from the reflected radiation), reflective styli/pens and items which may be worn by the user (e.g. a ring or thimble which may be worn on a user's finger).

In other examples the apparatus described herein may be used in combination with an active object. There are different kinds of active objects, including:

an object comprising an active tag, such as an RFID tag
an object which is capable of emiting radiation, e.g. it may comprise an emitter (e.g. similar to the emitter 401 in the sensor 400)
an object comprising communication means (e.g. Bluetooth, IrDA etc) by which it may communicate data with the computing device.

The active nature of the object may be used to identify the object (in a similar manner to the passive tagged object described above), to assist in proximity detection (e.g. using active or semi-active techniques) or to communicate additional data (e.g. fine motion data of the object, user click actions etc). The active object may, for example, be an object which is held by a user (e.g. a stylus, mouse-like object or gaming piece) or worn by a user (e.g. a thimble or ring). In another example, the active object may be designed to be fitted on or around another object, for example, a sleeve or tip for a pen.

In a first example an object may comprise an active tag, such as an RFID tag, which may communicate identity information to the device. A passive object may also comprise an RFID tag, although in this case it would be a passive tag read by an RFID reader in the device. As described above, use of different tagged objects may result in the device operating in different ways or may identify different users, different access levels etc.

In a second example the object comprises an emitter of a wavelength which is detected by the sensors in the computing device. As described above, the source in the object may be modulated and the detected signal filtered to distinguish between radiation emitted by the object and other radiation (e.g. ambient radiation). Through use of an emitting object, the resolution/accuracy of proximity detection may be improved and/or the analysis required (in block 203) may be simplified. In a further example, the nature of the emitted radiation may identify the object. The object therefore is a tagged object and the use and effect of a tagged object is described above.

In a third example the object may comprise an accelerometer (or other motion detector) and a communication means (e.g. a Bluetooth transmitter). In such a situation, the object may record data about its fine movement and transmit this data to the computing device. This information may be combined with the output of the analysis process, which may comprise coarse movement data, to provide more accurate data on the movement of the object. In an example, the proximity sensing in combination with the communication of fine movement data may be used to digitize a position of a pen with an active sleeve/tip, e.g. to provide a handwriting input means for a PDA, mobile telephone or other device. In a further example, the object may communicate other data such as the amount of pressure at a pen tip or a user click action etc.

In the situation where only active objects are used in conjunction with the computing device (and no passive objects), the sensors in the device may comprise not necessarily comprise emitters, but in some examples may just comprise detectors which detect radiation emitted by the active objects. When such an emitting object is used, the emitted radiation is detected by sensors in the device and the separation of the device and the object can be inferred from the detected intensity.

In further examples, any active tracking technique may be used, including but not limited to, acoustic/ultrasonic clicks, time of flight and magnetic/inductive/capacitive techniques. In an example, a surface acoustic wave (SAW) may be sent along a surface on which the device is placed and reflections detected. Such an example may use multiple SAW sources/sensors.

In some examples, the user may be provided with a set of several tagged objects (which may be active or passive) which may be used in combination with the computing device and dependent on the object which is selected and used, the device may be controlled in a different manner. In an example, the object's tag may identify the user (e.g. where each user has an object which emits radiation with a different modulation pattern or at a different wavelength) or the user's access level.

Figure 11:
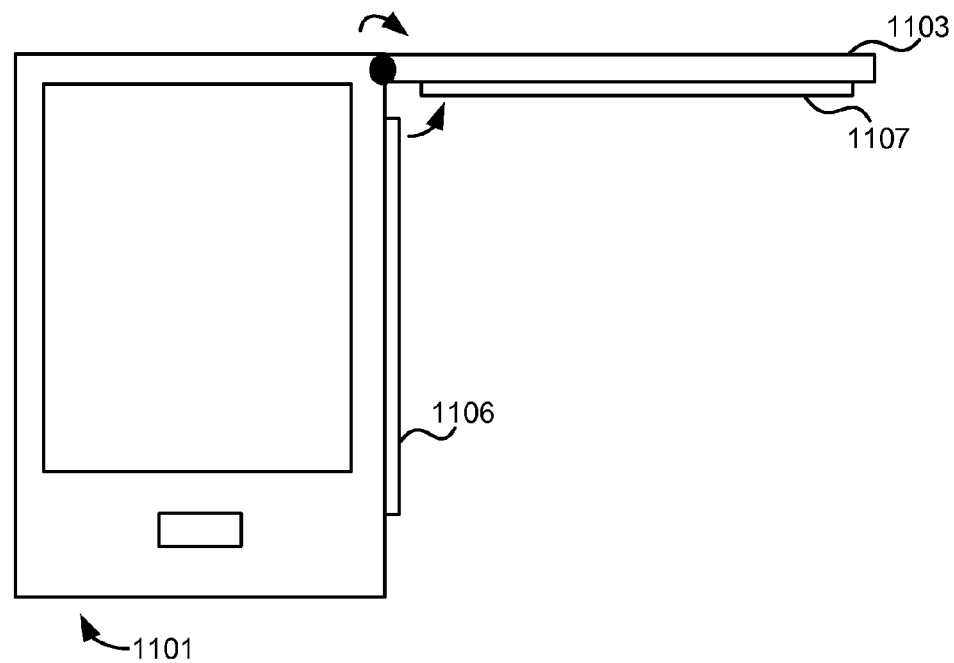
FIGS. 11 and 12 show schematic diagrams of portable computing devices which incorporate portions which fold, slide or roll out from the main body.
Figure 11:
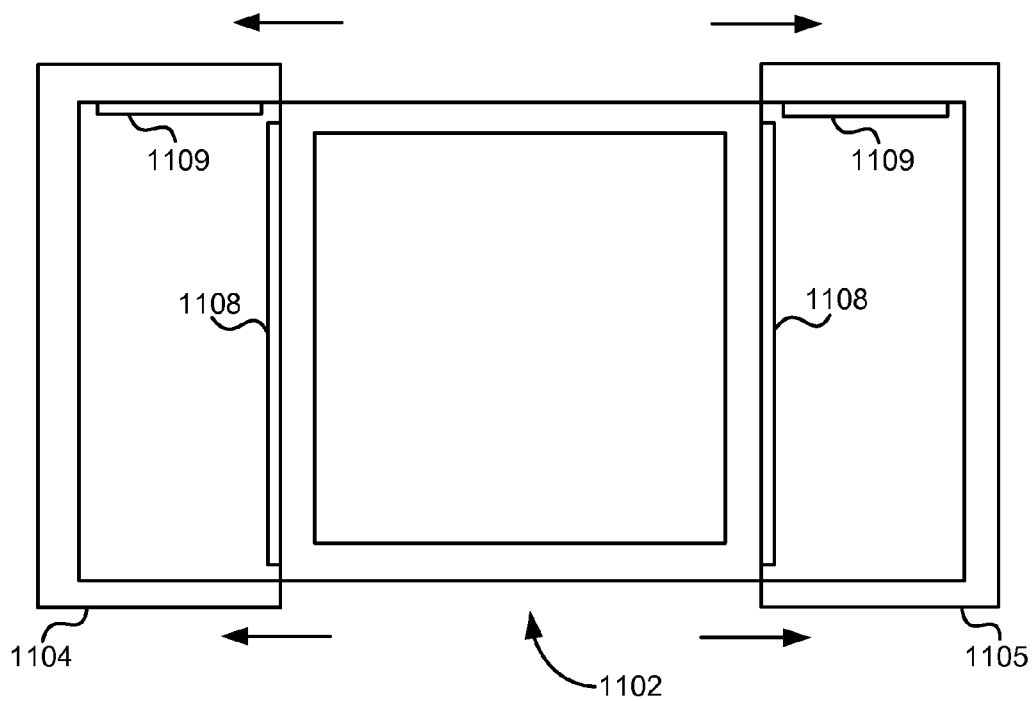

FIG. 11 shows schematic diagrams of two portable computing devices 1101, 1102 which incorporate portions 1103-1105 which fold/slide out from the main body in order to define the area of interaction of the device and to provide improved sensing of gestures. In both example devices, the additional portions which fold/slide out result in there being arrangements of proximity sensors (or sensing points) on two perpendicular faces, which may result in improved sensing (e.g. improved resolution, increased number of gestures that can be recognized etc). In other examples, proximity sensors may be provided on more faces (e.g. all four faces in device 1102). In the first example device 1101, a portion 1103 folds out to create an area of interaction defined by two sets of proximity sensors: one set 1106 on the side of the main body of the device and the second set 1107 on the additional portion. The additional portion 1103 may fold out in any way and two examples are indicated by the two arrows. In the second example device 1102, there are two portions 1104, 1105 which slide out from the main body. These portions provide a frame to the areas of interaction on each side of the device and there are arrangements of sensors on either side of the main body 1108 and on one or more of the inner faces of the frames 1109.

Figure 12:
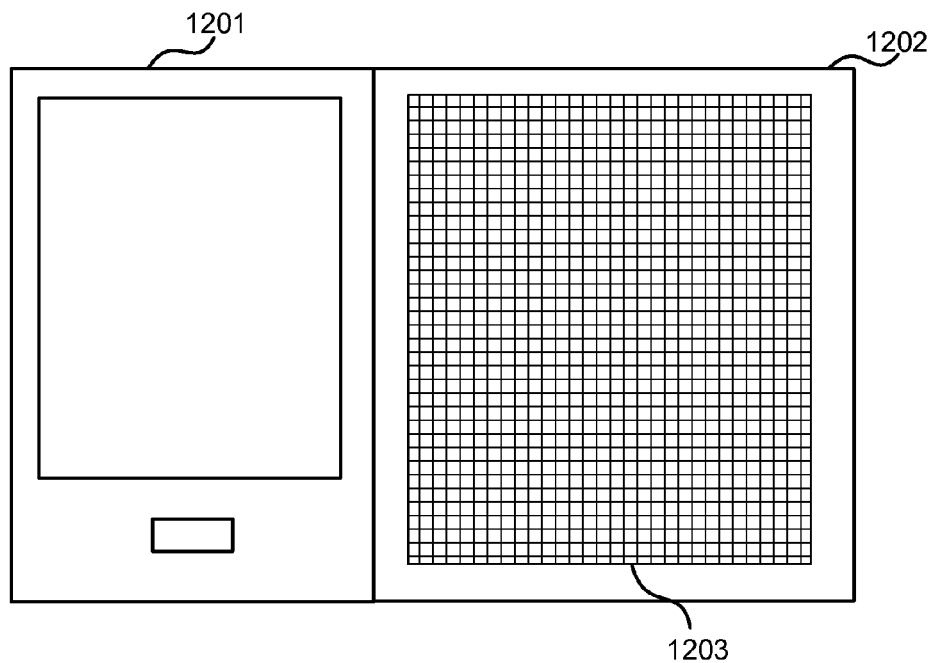
Figure 12:
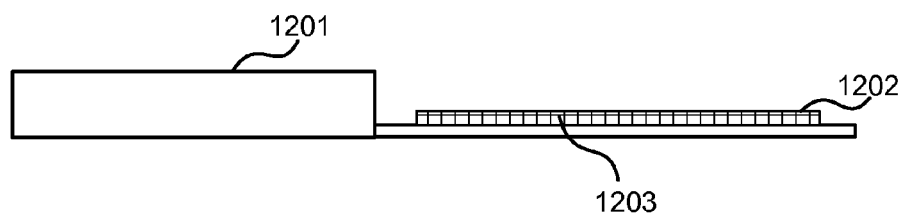

FIG. 12 shows a schematic diagram of a further portable computing device 1201 which incorporates a portion 1202 which folds, slides or rolls out from the main body in order to define the area of interaction of the device. FIG. 12 shows a top view and a side view of the example device. In this example, the portion which folds/slides/rolls out 1202 has an arrangement of proximity sensors 1203 on the top surface of the portion. These proximity sensors may be similar to that shown in FIG. 4 and described above or any other kind of proximity sensor. In another example, resistive or capacitive touch sensor pads may be used to define an area of interaction adjacent to the device. The portion 1202 may be fabricated from a flexible material (e.g. a flexible PCB) such that it can be rolled up or wrapped around the device body when not in use.

Figure 13:
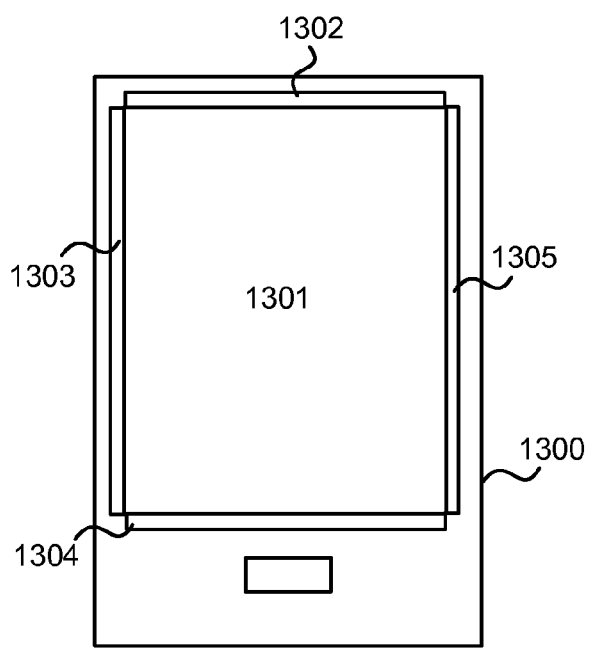
FIG. 13 is a schematic diagram of a second portable computing device.

As described above, the arrangements of proximity sensors may be anywhere on the portable electronic device. In a further example, arrays of sensors may be located around a display, as shown in FIG. 13. FIG. 13 shows a portable computing device 1300 with a display 1301 and four arrays of proximity sensors 1302-1305 arranged around the display. Alternatively these four arrays could be replaced by an arrangement of sensors in a square going all the way round the display or only two perpendicular arrays (e.g. arrays 1302 and 1303) may be provided. In this example, the user may pan left/right by gesturing along the length of one or both arrays 1302 and 1304 and the user may scroll up/down by gesturing along the length of one or both arrays 1303 and 1305.

Although the above description refers to use of proximity sensors on the surfaces of portable computing devices, the proximity sensors may also be integrated with non-portable computing devices. In an example, the arrangements of sensors may be located around a large touch screen device like Microsoft® Surface. The sensors may be used to detect the trajectories of arms of a user passing over the edge of the touch sensitive surface. In a multi-touch, multi-user environment this sensory information may aid in determining which touch events on the touch screen are likely to have been made by which user. In a further example, the proximity sensors and methods described herein may be integrated with a digital photograph frame to enable a user to scroll through images, or otherwise control the application running on the digital photograph frame, without placing their fingers on the display surface. In another example, the apparatus and methods described herein may be integrated into televisions or large computer monitors to enable a user to interact with applications being displayed on the monitor (which may, for example, be displayed in the living room of a house) without requiring a keyboard or mouse. The techniques may also be applied to other household appliances or any other devices with computing capability to enable a user to interact through gestures in an interaction area close to the device and in some examples to the side of the device.

Figure 14:
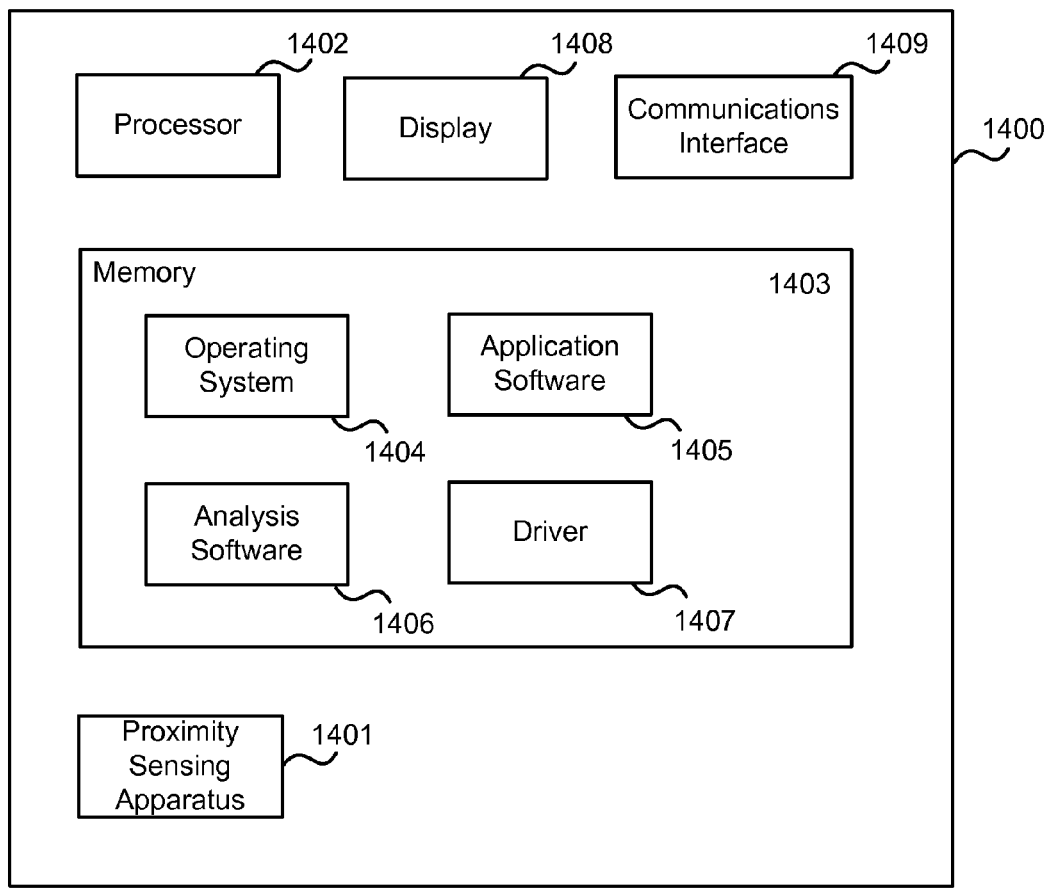
FIGS. 14 and 15 illustrate further exemplary computing-based devices.
Figure 15:
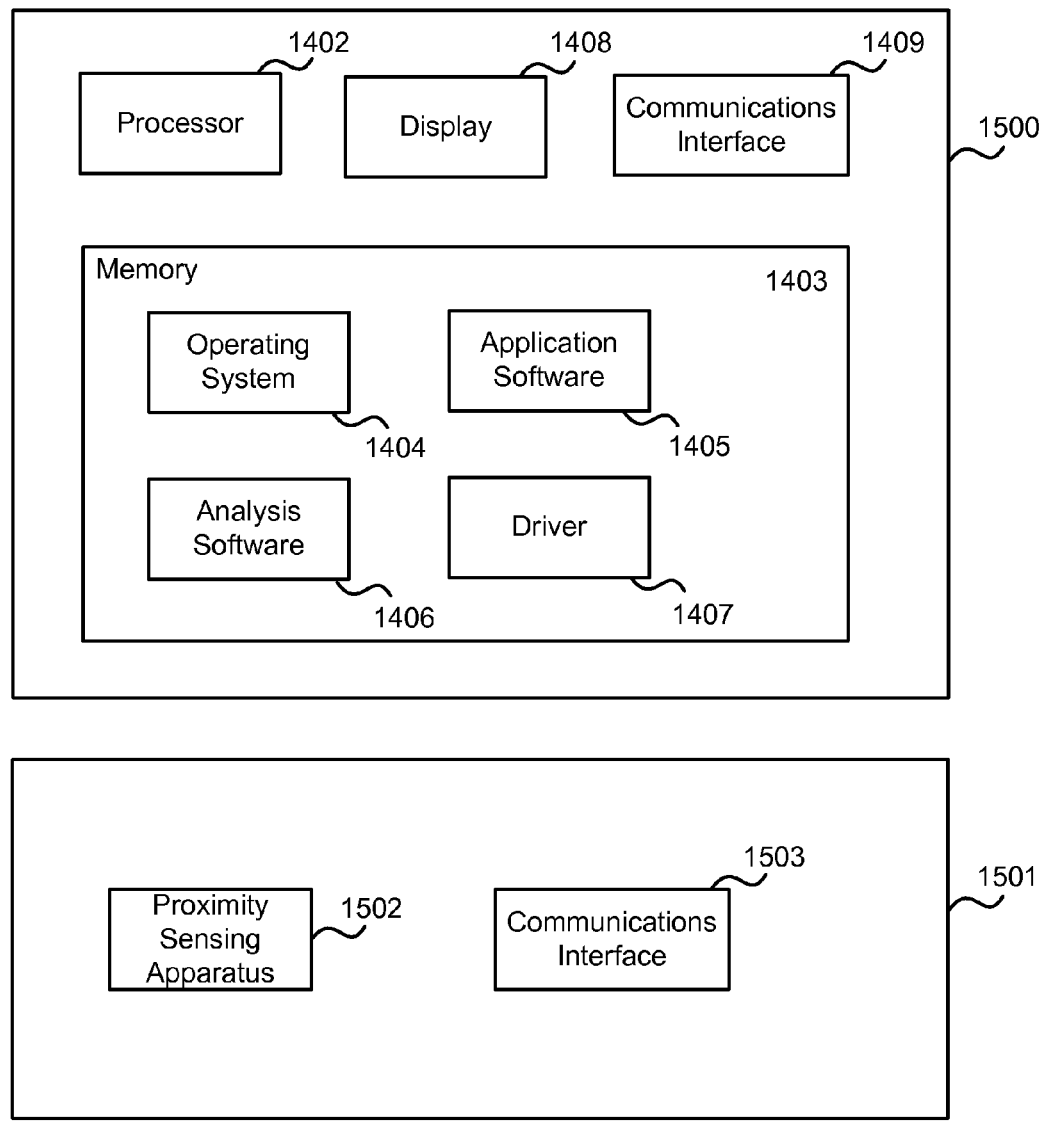

In some embodiments, the proximity sensing apparatus (e.g. the sensors and any waveguides/optics) may be integrated within the computing device and in other examples, the proximity sensing apparatus may be provided in a jacket or cover which can be retrofitted to a device. FIGS. 14 and 15 which are described below show two different embodiments.

FIG. 14 illustrates various components of an exemplary computing-based device 1400 which may be implemented as any form of a computing and/or electronic device, and which has integrated proximity sensing apparatus 1401. Computing-based device 1400 also comprises one or more processors 1402 which may be microprocessors, controllers or any other suitable type of processors for processing computing executable instructions to control the operation of the device, including to collect and analyze data to identify gestures (as shown in FIG. 2).

The computer executable instructions may be provided using any computer-readable media, such as memory 1403. The memory may be of any suitable type such as random access memory (RAM), a disk storage device of any type such as a magnetic or optical storage device, a hard disk drive, or a CD, DVD or other disc drive. Flash memory, EPROM or EEPROM may also be used. Platform software comprising an operating system 1404 or any other suitable platform software may be provided at the computing-based device (e.g. stored in memory 1403) to enable application software 1405, 1406 to be executed on the device. The application software may include the analysis software 1406 used to detect gestures (block 203 of FIG. 2).

The mapping of gestures to control inputs (block 204) to enable the gestures to be used to control the operation of the device, may be performed by a device driver 1407 (e.g. a virtual mouse driver) or may be included within an operating system 1404 which is designed to accept inputs by gesture (and may also incorporate the analysis functionality). In this implementation, the application software 1405 may be standard application software. In another implementation, particular application software may be designed to receive gesture inputs and in this situation, the mapping of gestures (block 204) may be performed within the application software. The analysis (of block 203) may, in some examples, also be integrated within the application software.

The computing-based device 1400 also comprises a display 1408 and may further comprise a communications interface 1409 (e.g. an interface to a cellular, WiFi or other network). The device may also comprise other user input means (e.g. one or more buttons), other inputs and outputs (not shown in FIG. 14).

FIG. 15 illustrates various components of an exemplary computing-based device 1500 which may be implemented as any form of a computing and/or electronic device, and a jacket or cover 1501 which may be used in combination with the device and which has integrated proximity sensing apparatus 1502. The computing-based device 1500 may be substantially the same as that shown in FIG. 14, but without the integrated proximity sensing apparatus 1401. The jacket 1501 may comprise a communication interface 1503 which may be used to provide the sensor data to the computing-based device 1500. This communication may be between the communication interface 1503 in the jacket 1501 and the communication interface 1409 in the device 1500. The communication may be over any suitable connection, which may be wired (e.g. mini or micro USB or a proprietary connection) or wireless (e.g. Bluetooth or WiFi).

The jacket 1501 may further comprise a processor and memory (not shown in FIG. 15). The processor (executing instructions which may be stored in the memory in the jacket) may be used to control the transfer of sensor data to the device or alternatively the generation of proximity sensor images (block 202) and analysis of sequences of images (block 203) may be performed by the jacket and the output communicated to the device 1500. In yet a further example, the processor in the jacket may also perform the mapping (block 204) and therefore communicate control inputs to the device.

Where the device 1500 includes a camera (not shown in FIG. 15), the proximity sensing apparatus 1502 may include an optical train to enable the camera in device 1500 to be used in proximity sensing (e.g. as described above). In this example, the generation of images (block 202), analysis of image sequences (block 203) and mapping to control inputs/actions (block 204) are all performed by the device 1500 and not by the jacket. In this example, the jacket 1501 may not require a communication interface 1503.

In the above examples, the sensors are located on a computing device, which may or not be portable, in other embodiments proximity sensors may be incorporated in, or retrofitted to, other devices such as peripherals for computing devices. In an example, a keyboard may have an arrangement of proximity sensors on either end and in another example, a joystick (or other gaming input device) may have an arrangement of proximity sensors wrapped around it. This may enable a virtual mouse functionality, such that a separate physical mouse device is not required. In further examples, the proximity sensors may be incorporated into or retrofitted onto other devices so as to provide new peripheral devices for computing devices. For example, an arrangement of sensors may be around a steering wheel to enable a user to provide gesture input to a car's computing system. The proximity sensors may also be used to detect the approach of a driver's hands to the steering wheel, which may trigger certain actions by the car's computing device (e.g. illuminating dash board, turning vehicle lights on etc). In another automotive example, the proximity sensors may be incorporated into a door or door handle of a car. When the user is detected in close proximity, or a particular gesture is detected, the lock may be illuminated or the car's lights may be switched on.

Whilst the description above refers to detection of gestures/motion through analysis of a number of images (e.g. through detection of change between images), in other examples, motion/gestures may be detected through analysis of a single image from the sequence of images. This may include detection of the relative position of the sensed object (which may be the user's hand) from the device itself. This may be particularly applicable where the input is being used as a mouse/pointer replacement and the position of the mouse/pointer may be dependent on the position of the sensed object relative to the device.

Although the description above refers to proximity detection, the sensors may also be able to detect touch events.

In the FIGS. and above description, the arrangements of sensors are shown as 2D arrangements (e.g. 2D arrays), however in some implementations the sensors may be arranged in a 1D arrangement, i.e. in a line.

Although the present examples are described and illustrated herein as being implemented in a portable system, the system described is provided as an example and not a limitation. As those skilled in the art will appreciate, the present examples are suitable for application in a variety of different types of computer based systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A device comprising:
    a plurality of sensors, the plurality of sensors configured to detect user input in an interaction area that extends outwardly from a surface of a casing of the device and that is at least in a plane of a display portion associated with the device;
    a processor; and
    a memory arranged to store executable instructions, which when executed by the processor, cause the processor to:
        control operation of the plurality of sensors by sensitivity of gesture detection in the interaction area, wherein a set of operational sensors changes from a first set comprising a plurality of high sensitivity sensors to a second set comprising at least a plurality of low sensitivity sensors after motion is detected in the interaction area based on an application being executed on the device;
        create a sequence interaction data from data received from the second number of operational sensors; and
        analyze the sequence interaction data to identify a user gesture in the interaction area.

2. A device according to claim 1, wherein the memory is further arranged to store executable instructions which when executed by the processor, cause the processor to:
    control a software program running on the device based on the identified gesture.

3. A device according to claim 1, wherein the memory is further arranged to store executable instructions which when executed by the processor, cause the processor to:
    map the identified gesture to a control input to a software program running on the device.

4. A device according to claim 1, wherein the plurality sensors are further configured to detect user input in the interaction area when the interaction area is devoid of any electronic devices.

5. A device according to claim 1, wherein the display portion is attached to the casing.

6. A device according to claim 1, wherein the plurality of sensors are arranged relative to each other in a sensor plane, the sensor plane being non-parallel to the plane of the display portion.

7. A device according to claim 1, further comprising:
    at least one emitter;
    at least one detector; and
    a plurality of waveguides,
    and wherein each proximity sensing point is optically connected to a detector by one of the plurality of waveguides and each proximity sensing point is optically connected to an emitter by one of the plurality of waveguides.

8. A device according to claim 1, wherein each proximity sensor image comprises a map of intensities detected at each of the plurality of proximity sensing points.

9. A device according to claim 1, wherein the plurality of sensors are arranged relative to each other in a sensor plane, the sensor plane being perpendicular to the plane of the display portion.

10. A device according to claim 1, wherein analyzing the sequence of proximity sensing images comprises:
    subtracting a background image from each image to create a processed version of each image; and
    analyzing a sequence of processed versions of images to detect a gesture.

11. A device according to claim 1, wherein analyzing the sequence of proximity sensing images comprises:
    analyzing one of the sequence of proximity sensing images; and
    determining a position of a sensed object from the one of the sequence of proximity sensing images.

12. A device according to claim 1, wherein the non-display portion of the device comprises one or more sides of the device.

13. A device according to claim 1, wherein the memory is further arranged to store executable instructions, which when executed by the processor, cause the processor to:
    create a sequence of interaction data from data received from an active or passive tagged object.

14. A device according to claim 1, wherein the device comprises a cover for a portable computing device.

15. One or more tangible device-readable media, the tangible device-readable media being hardware, with device-executable instructions for performing steps comprising:
    collecting data from a plurality of sensors, the plurality sensors configured to detect user input in an interaction area that extends outwardly from a surface of a casing of the device and that is at least in a plane of a display portion associated with the device;
    controlling operation of the plurality of sensors by sensitivity of gesture detection in the interaction area, wherein a set of operational sensors changes from a first set comprising a plurality of high sensitivity sensors to a second set comprising at least a plurality of low sensitivity sensors after motion is detected in the interaction area based on an application being executed on the device;
    creating a sequence interaction data from data received from the second number of operational sensors; and
    analyzing the sequence interaction data to identify a user gesture in the interaction area.

16. One or more tangible device-readable media according to claim 15 further comprising device-executable instructions for performing steps comprising:
    mapping the gesture to an input to software running on the device.

17. One or more tangible device-readable media according to claim 16, further comprising device-executable instructions for performing steps comprising:
    controlling the software according to the input.

18. One or more tangible device-readable media according to claim 15, wherein analyzing the sequence of proximity sensing images comprises:
    subtracting a background image from each image to create a processed version of each image; and
    analyzing a sequence of processed versions of images to detect a gesture.

19. One or more tangible device-readable media according to claim 15, wherein each proximity sensing point comprises an emitter and a detector and wherein the emitter is modulated, and wherein collecting data from a plurality of proximity sensing points comprises:

filtering a signal received at each detector to produce filtered data; and collecting filtered data from each detector.

20. A method comprising:

collecting data from a plurality of sensors, the plurality sensors configured to detect user input in an interaction area that extends outwardly from a surface of a casing of the device and that is at least in a plane of a display portion associated with the device;

controlling operation of the plurality of sensors by sensitivity of gesture detection in the interaction area, wherein a number of operational sensors changes from a first number to a second number after motion is detected in the interaction area based on an application being executed on the device;

creating a sequence interaction data from data received from the second number of operational sensors; and allowing a user to store the sequence interaction data as a user-defined gesture.

* * * * *